(12) United States Patent
Koda et al.

(10) Patent No.: US 7,314,360 B2
(45) Date of Patent: Jan. 1, 2008

(54) STRETCH ROD EXTENDING DEVICE AND BOTTOM MOLD LIFTING DEVICE FOR STRETCH BLOW MOLDING MACHINE

(75) Inventors: Hideaki Koda, Nagano (JP); Sentaro Kobayashi, Nagano (JP); Osamu Sakai, Nagano (JP); Motohiro Matsuzawa, Nagano (JP)

(73) Assignee: A.K. Technical Laboratory, Inc., Nagano (JP)

( * ) Notice: Subject to any disclaimer, the term of this patent is extended or adjusted under 35 U.S.C. 154(b) by 411 days.

(21) Appl. No.: 10/537,972

(22) PCT Filed: Dec. 10, 2003

(86) PCT No.: PCT/JP03/15818

§ 371 (c)(1),
(2), (4) Date: Jun. 9, 2005

(87) PCT Pub. No.: WO2004/052623

PCT Pub. Date: Jun. 24, 2004

(65) Prior Publication Data

US 2006/0068048 A1   Mar. 30, 2006

(30) Foreign Application Priority Data

Dec. 12, 2002 (JP) .............................. 2002-360976
Dec. 27, 2002 (JP) .............................. 2002-381415

(51) Int. Cl.
  *B29C 49/12* (2006.01)
  *B29C 49/48* (2006.01)
(52) U.S. Cl. .......................................... 425/3; 425/529
(58) Field of Classification Search ................ 425/3, 425/529; 264/532
See application file for complete search history.

(56) References Cited

U.S. PATENT DOCUMENTS 5,269,672 A * 12/1993 DiGangi, Jr. ................ 425/150
5,456,134 A * 10/1995 Bouwer et al. ........... 74/490.09
5,687,614 A * 11/1997 Hashimoto et al. ......... 335/285
6,111,491 A *  8/2000 Furuse et al. ............... 335/285

FOREIGN PATENT DOCUMENTS

| EP | 0 703 058 A2 | 3/1996 |
|----|--------------|--------|
| JP | 05-330535    | 12/1993 |
| JP | 08-017625    | 1/1996 |
| JP | 2000-043131  | 2/2000 |
| JP | 2000-213615  | 8/2000 |

* cited by examiner

*Primary Examiner*—Robert B. Davis
(74) *Attorney, Agent, or Firm*—Weingarten, Schurgin, Gagnebin & Lebovici LLP

(57) ABSTRACT

Improvement of simplicity and durability of a stretch rod extending device and a bottom mold lifting device, equipped on a stretch blow molding machine, is achieved by applying a combination of a magnetic screw shaft and a magnetic nut member, which is able to convert rotary-linear movement smoothly without contact. The nut member and the screw shaft of the extending device 6 and lifting device 30 comprise a magnetic nut member 65, 116 and a magnetic screw shaft 66, 117, having spiral N magnetic pole and S magnetic pole alternately provided on inner peripheral surface of a cylindrical member and outer peripheral surface of a shaft at a same regular pitch. The magnetic screw shaft is inserted into the plunger 61, 115, having the magnetic nut member equipped inside with keeping required clearance so as to match the magnetic pole to oppose the magnetic nut member at the same poles each other.

16 Claims, 6 Drawing Sheets

STRETCH ROD EXTENDING DEVICE AND BOTTOM MOLD LIFTING DEVICE FOR STRETCH BLOW MOLDING MACHINE

This application is a 371 national phase filing of PCT/JP2003/015818 filed Dec. 10, 2003, and claims priority to Japanese application No. 2002-360976 filed Dec. 12, 2002 and to Japanese application No. 2002-381415 filed Dec. 27, 2002.

TECHNICAL FIELD

The present invention relates to a stretch rod extending device and a bottom mold lifting device for a stretch blow molding machine, which extends the stretch rod or lifts the bottom mold by converting rotary movement of an electric motor to linear movement with using combination of a screw member and a nut member.

BACKGROUND ART

In a stretch blow molding machine, Japanese patent publication no. 2000-43131 discloses that extending movement of a stretch rod for stretching a preform is done by converting rotary movement of an electric motor to linear movement with using combination of a ball screw and a ball nut.

In the rotary-linear movement converter comprising a ball screw and a ball nut, it is necessary to provide a circulating path for balls in order to make the relative thrust movement of the ball screw and the ball nut smooth. Therefore, the circulating path for balls is protrusively formed on the side of the body of the ball nut, and this is the reason why it is difficult to make the ball nut simple and compact.

The balls in the thread receive a compressive stress in every extensive movement of the stretch rod by being caught in the thread, so balls often reach fatigue fracture from the compressive stress when the extensive movement is repeated for a long time. Besides, the ball screw has a problem of requiring a lot of maintenance such as oiling to prevent the heat from friction.

Moreover, when a preform is formed into a bottle by air blow with lifting a bottom mold into a cavity and clamping the bottom portion of the preform with a stretch rod, if the bottom mold collides the tip of the stretch rod, the impact acts on the ball screw as a compressive force, and this becomes a cause of a trouble such as bending of stretch rods. To prevent such a trouble, it requires a locating control, which controls both of the extending movement of the stretch rod and the lifting movement of the bottom mold together, and makes the stretch rod and the bottom mold stop at a preset point.

As a means for clamping the bottom portion of a preform, Japanese patent publication no. 2000-43131 discloses an apparatus comprising a bottom mold having a movable center pin in the center of the bottom mold, and the lifting means for the center pin comprises a screw shaft and a nut member. In this case, the apparatus has a problem as mentioned above.

The present invention solves the problem mentioned above by adopting a converting means comprising a combination of a magnetic screw shaft and a magnetic nut member, which enable to convert rotary movement into linear movement smoothly without contact, and provides a novel stretch rod extending device which enables to improve the precision of the stretch rod and simplicity and the durability of the device.

Moreover, the present invention also provides a novel bottom mold lifting device which enables to improve the precision of the bottom mold and simplicity and the durability of the device by adopting a converting means comprising a magnetic screw and a magnetic nut member as a lifting means for the bottom mold of the blow mold. As disclosed in Japanese patent no. 2685723, the usage of the converting means comprising a combination of a magnetic screw shaft and a magnetic nut member is limited for conveyors. The present invention connects a combination of a magnetic screw shaft and a magnetic nut member to a stretch rod or a bottom mold with a specific construction, and provides a novel stretch rod extending device and bottom mold lifting device, which are not obvious to be imagined from the conventional usage as conveyors.

DISCLOSURE OF INVENTION

For the objects mentioned above, the present invention provides a stretch rod extending device for a stretch blow molding machine, wherein said stretch blow molding machine comprises; a blow mold, which is openable and closable; a neck mold, which holds a preform and closes with the blow mold; a core supporting plate, which holds a blow core member which fit with the neck mold; and a rod fixing plate, which holds a stretch rod inserted into the preform through the blow core member; wherein the neck mold, the core supporting plate, and the rod fixing plate are movable up and down together or separately, and the rod fixing plate is connected to a stretch rod extending device, and the stretch rod extending device comprises a nut member and a screw shaft which converts rotary movement of a electrical servo motor to linear movement, and wherein the nut member and the screw shaft comprise a magnetic nut member and magnetic screw shaft having spiral N magnetic pole and S magnetic pole alternately provided on inner peripheral surface of a cylindrical permanent magnetic member and outer peripheral surface of a permanent magnetic shaft at the same pitch, and the magnetic screw shaft is inserted into a cylindrical plunger having the magnetic nut member equipped inside by keeping required clearance between the magnetic screw shaft and the magnetic nut member so as to match the same magnetic poles.

Besides, the stretch rod extending device according to the present invention comprises; a cylinder, of which the front end is opened and the rear end is closed; the cylindrical plunger, which is inserted into the cylinder and movable in and out from the front end of the cylinder; a magnetic nut member, which is fit inside the plunger; the magnetic screw shaft, which is stably inserted from a first bearing member, fixed on the rear end of the cylinder, into the plunger through the magnetic nut member with keeping required clearance between the magnetic screw shaft and the magnetic nut member so as to match the same magnetic poles; and the electrical servo motor, which is connected to the magnetic screw shaft and rotates the magnetic screw shaft forward or reverse, and the required clearance between the magnetic nut member and magnetic screw shaft is maintained by a front shaft of the magnetic screw shaft, a second bearing, installed between the front shaft and the plunger, and the first bearing member.

Moreover, the stretch rod extending device according to the present invention is installed on a stretch blow molding device by mounting the cylinder vertically with keeping the electrical servo motor up on a mounting base, which is connected to the core supporting plate and set above the rod fixing plate, and the plunger is connected to the rod fixing plate.

The rod fixing plate is movable up and down between the mounting base, which is connected to a piston rod of a lifting cylinder mounted on the upper portion of the stretch blow molding device and is installed above the rod fixing plate, and the core supporting plate below with being guided by a tie rod, connecting the mounting base and the core supporting plate, and the rod fixing plate moves up and down with the core supporting plate by the lifting cylinder via the extending device, connected to both the mounting base and the core supporting plate.

Also, the present invention provides a bottom mold lifting device for a stretch blow molding machine, wherein the stretch blow molding device comprises; a blow mold, which is openable and closable; a neck mold, which holds a preform and closes with the blow mold; a stretch rod which is inserted into the preform through a blow core member, which fit into the neck mold; and wherein a lifting device for a bottom mold of the blow mold comprises a nut member and a screw shaft which converts the rotary movement of a electrical servo motor to linear movement, and wherein the nut member and the screw shaft comprise a magnetic nut member and magnetic screw shaft having spiral N magnetic pole and S magnetic pole alternately provided on inner peripheral surface of a cylindrical permanent magnetic member and outer peripheral surface of a permanent magnetic shaft at the same pitch, and the magnetic screw shaft is inserted into a cylindrical plunger having the magnetic nut member equipped inside by keeping required clearance between the magnetic screw shaft and the magnetic nut member so as to match the same magnetic poles.

The bottom mold lifting device comprises; a cylinder, of which the front end is opened and the rear end is closed; a spline bush, which fits in the front end of the cylinder; the plunger, having a splined portion, which is formed on the outer peripheral surface and engages with the spline bush, and movable in and out from the front end of the cylinder; the magnetic screw shaft, which is stably inserted from a first bearing member, fixed on the rear end of the cylinder, into the plunger through the magnetic nut member by keeping required clearance between the magnetic screw shaft and the magnetic nut member so as to match the same magnetic poles; and the electrical servo motor, which is connected to a rear shaft and rotates the magnetic screw shaft forward or reverse, and wherein the cylinder is mounted vertically on the lower surface of the base under the blow mold with keeping the electrical servo motor down, and the plunger is connected to the bottom mold through the opening of the base, and a front shaft of the magnetic screw shaft is movable in a concavity of the bottom mold, and the required clearance between the magnetic nut member and magnetic screw shaft is maintained by the first bearing member and a second bearing member installed between the front shaft and the plunger.

BEST MODE FOR CARRYING OUT THE INVENTION

Figure 1:
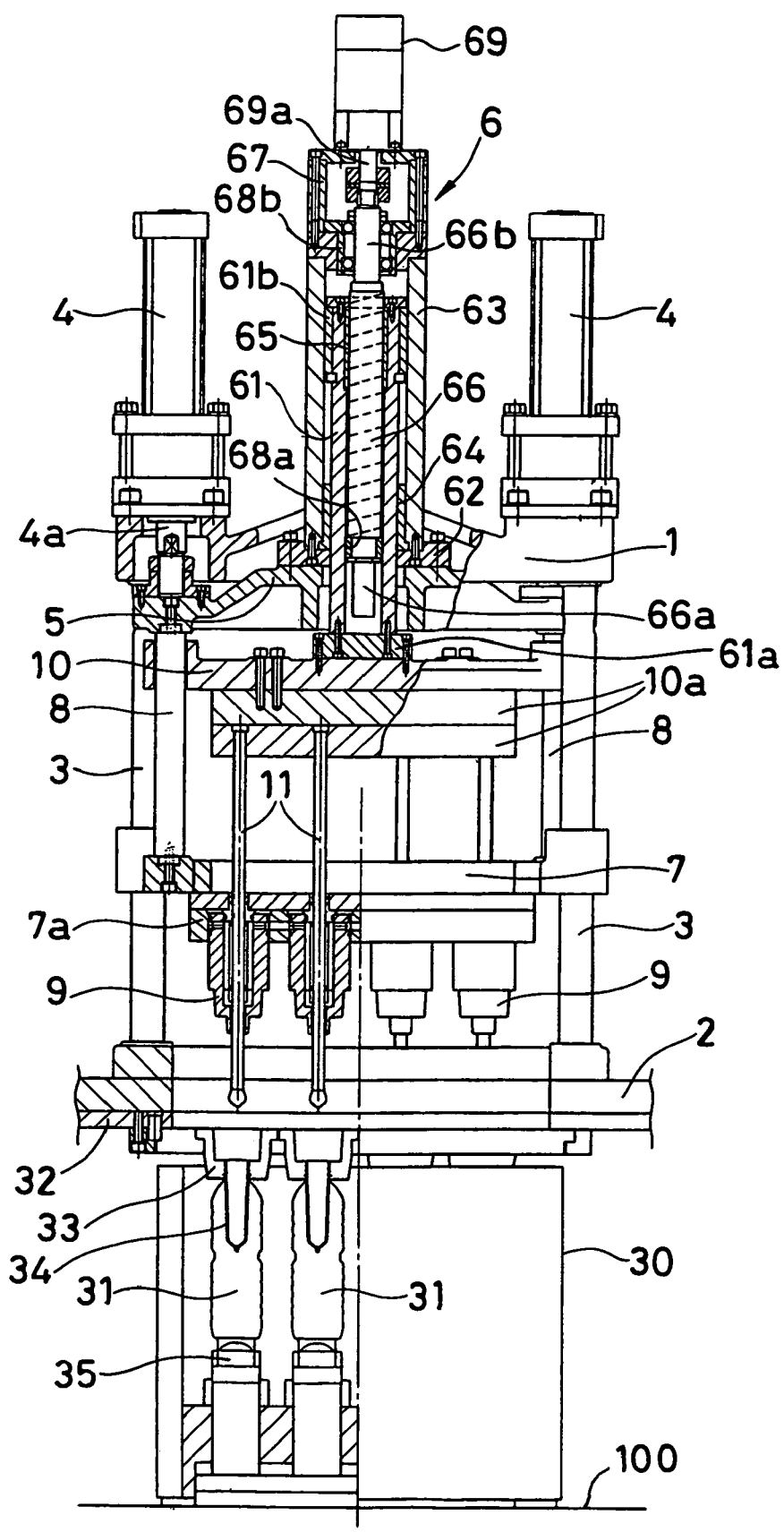
FIG. 1 is a vertical sectional front view illustrating the embodiment of the stretch blow molding machine having a stretch rod extending device according to the present invention.

FIG. 1 to FIG. 4 illustrate whole stretch blow molding machine. The stretch blow molding machine comprises a horizontal platen 2 which is movable up and down above a base 100 with keeping a operating space, blow molds 30 which can be opened and closed in the operating space on the base 100, and a stretch blow device placed on the platen 2.

The stretch blow device comprises a fixed base 1, which is horizontally fixed on the top of four shafts 3 wherein each two shafts 3 are erected on both sides of the platen 2; a pair of hydraulic or pneumatic lifting cylinders 4, which are vertically mounted at the center of the both ends of the fixed base 1; a mounting base 5, which has its both ends tied to piston rods 4a of the lifting cylinders 4 and is movable up and down under the fixed base 1; an extending device 6 for a stretch rod 11, mounted on the mounting base 5 at the center through the fixed base 1; a core supporting plate 7, which is guided along the shafts 3 at its four corners, has its both sides connected to the mounting base 5 via tie rods 8, and is movable up and down with the mounting base 5 above the platen 2; and rod fixing plate 10, which is guided along the tie rods 8 between the core supporting plate 7 and the mounting base 5 and connected to the extending device 6.

Same numbers of blow core members 9, pointing downward, as a plurality of blow cavities 31 of the blow mold 30 are fixed to a fixing plate 7a having an air path bored though and mounted under the core supporting plate 7. The flange portion of the stretch rods 11, pointing downward, are supported by a connecting plate 10a and installed under the rod fixing plate 10.

The extending device 6 comprises a cylinder 63, of which the front end is opened and the rear end is closed, and which is also used as a casing; a cylindrical plunger 61, which is inserted into the cylinder 63 and movable in and out from the front end of the cylinder 63; a magnetic nut member 65, which is fit inside the plunger 61; a magnetic screw shaft 66, which is inserted from a first bearing member 68b, fixed on the rear end of the cylinder 63, through the magnetic nut member 65 and the plunger 61, and of which the front shaft 66a is supported by the second bearing member 68a in the plunger 61; and an electrical servo motor 69, which is installed on a base 67 mounted on the rear end of the cylinder 63, and of which a drive shaft 69a is jointed to a rear shaft 66b of the magnetic screw shaft 66, supported by the first bearing member 68b. Besides, a guide bush 61b is inserted between the cylinder 63 and the plunger 61, and retained with a ring.

The magnetic nut member 65 and magnetic screw shaft 66 having about 65 N of step out strength comprise spiral N magnetic pole and S magnetic pole alternately provided on inner peripheral surface of a cylindrical permanent magnetic member and outer peripheral surface of a permanent magnetic shaft at a same regular pitch. The magnetic screw shaft 66 is set into the magnetic nut member 65 with keeping required clearance (e.g. 0.5 mm) so as to match the magnetic pole to oppose the magnetic nut member 65 at the same poles each other, and inserted into the plunger 61. The required clearance is maintained by the second bearing 68a supporting the front shaft 66a and the first bearing member 68b supporting the rear shaft 66b, and the magnetic shaft 66 keeps the magnetic pole opposed to the magnetic nut member 65 at the same poles each other.

The cylinder 63 is fixed vertically on a mounting plate 62, mounted at the center of the upper surface of the mounting base 5, the plunger 61, extending out through a guide bush 64, which is fit in the front end of the cylinder 63, is connected to the rod fixing plate 10 for the stretch rods 11 via a connecting plate 61a under the mounting base 5, and the extending device 6, as mentioned above, is installed on the stretch blow device. The connection of the plunger 61 and the rod fixing plate 10 prevents the magnetic nut member 65 and the plunger 61 from rotating, so that the magnetic nut member 65 moves linearly along the magnetic screw shaft 66 with the plunger 61 without rotating even the magnetic pole of the magnetic nut member 65 is matched to the magnetic screw member 66. When the magnetic screw shaft 66 stops, the magnetic nut member is restricted by the magnetic force, and the plunger 61 is retained at the position where it has been stopped. Retaining at the stopped position is made by giving torque on the magnetic screw shaft for applying load to the connecting plate 10 by the electrical servomotor 69.

The platen 2, on which the stretch blow device is mounted, is placed above the operating space and away from the blow mold 30, and when the transfer platen 32, installed under the platen 2, is rotated horizontally, and a preform 34, retained by a neck mold 33 attached under the platen 1, is transferred and located at the center of the blow mold 30, the preform 34 is moved down into the blow mold 30 by a lifting device which is not illustrated. Thus, as illustrated in FIG. 1, the blow mold 30 and the neck mold 33 are closed, and the preform is placed at the center of the cavity 31.

Figure 2:
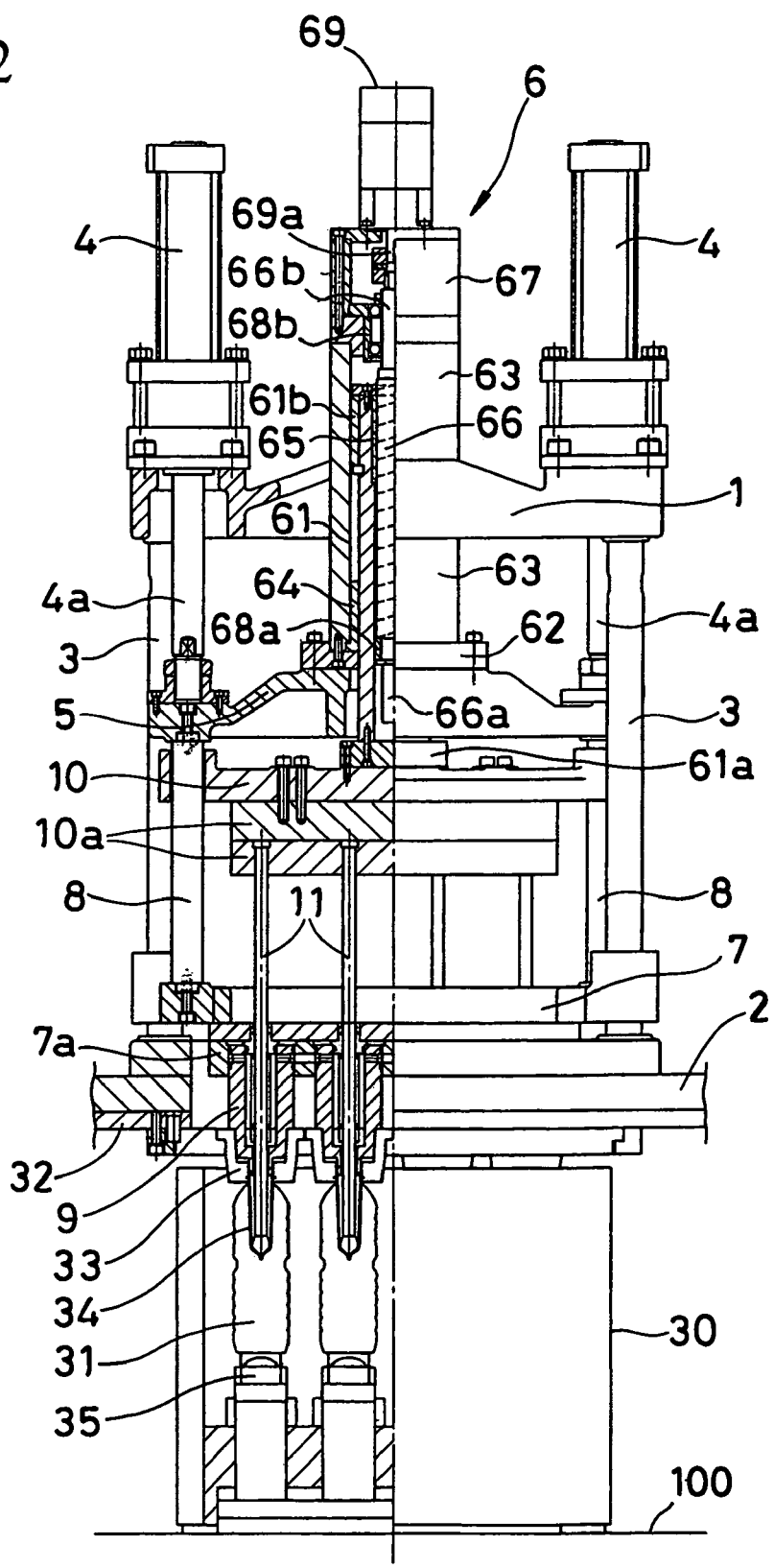
FIG. 2 is a vertical sectional front view of the stretch blow molding machine illustrated in FIG. 1 when the molds are closed.

After the blow mold 30 is closed, when a pair of the lifting cylinders 4 is operated together, the piston rod 4a, connected to the mounting base 5, is extended, and as illustrated in FIG. 2, the mounting base 5 of the extending device 6 and the core supporting plate 7 connected by the tie rods 8 are moved down until the core supporting plate 7 touches the upper surface of the platen 2, and the blow core member 9 fits air tightly to the neck mold 33.

At the same time, the rod fixing plate 10, supported by the extending device 6, moves down with the mounting base 5 through the extending device 6 by the plunger 61, held by the magnetic force of the magnetic nut member 65 and the magnetic screw shaft 66. Thus, the tip portion of the stretch rod 11, sticking out from the blow core member 9, is inserted through the neck mold 33 until the tip portion reaches the bottom of the inner surface of the preform 34.

After fitting of the blow core member 9 and insertion of the stretch rod 11 is completed, the electrical servo motor 69, applying torque on the magnetic screw shaft 66 to balance the weight of the rod fixing plate 10, is operated and rotate the magnetic screw shaft 66 forward (left). Thus, the plunger 61, in which the magnetic nut member 65 is fit and which is guided not to rotate, moves linearly down with the magnetic nut member 65, pushes the rod fixing plate 10, and the stretch rod 11 extends the preform 34 toward a bottom mold.

At the same time, blow air is blown from an air circuit of the blow core member 9, which is not illustrated, the preform 34 is expanded from upper portion to lower portion.

Figure 3:
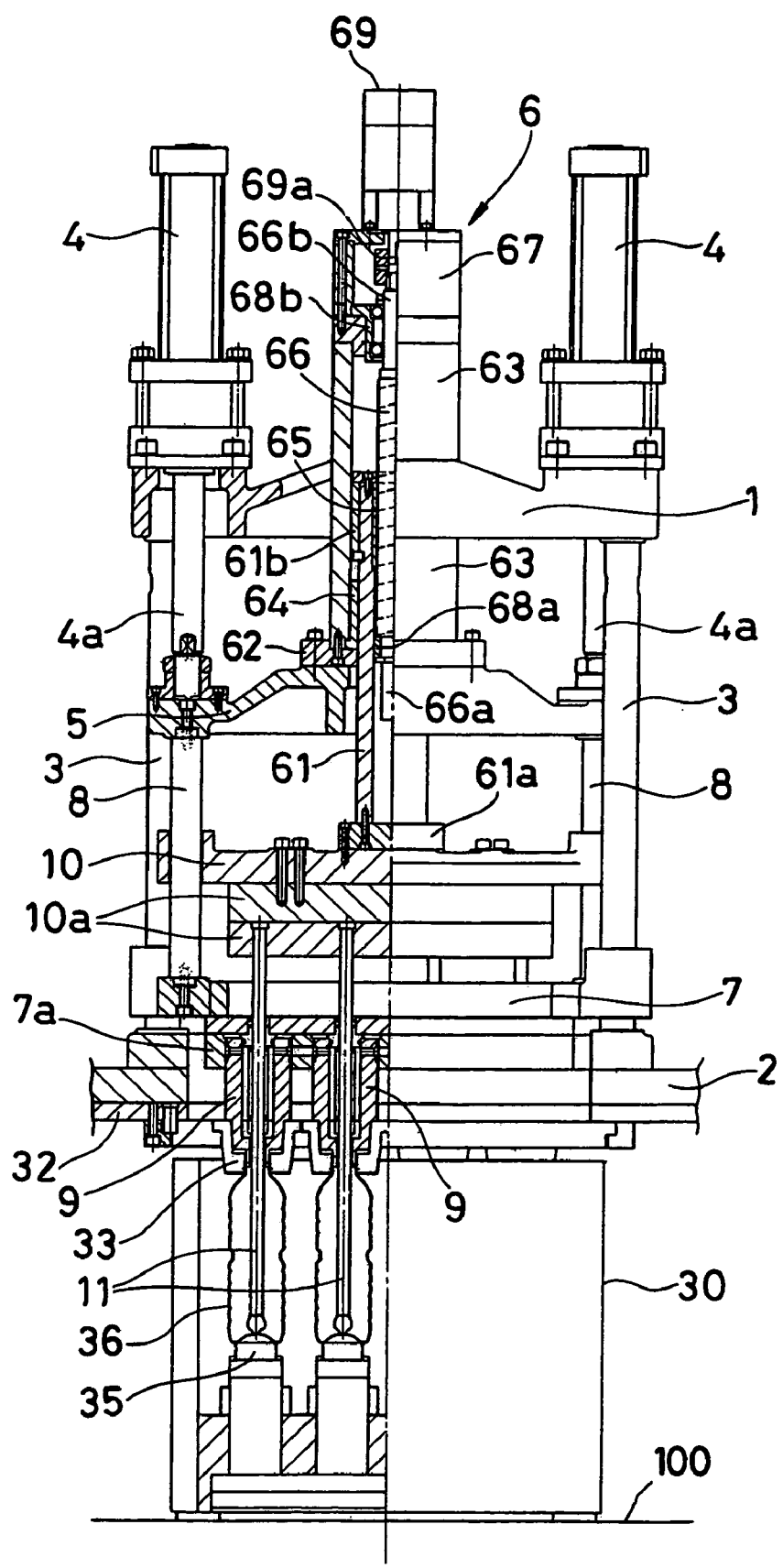
FIG. 3 is a vertical sectional front view of the stretch blow molding machine when stretch blow molding is operated.
Figure 4:
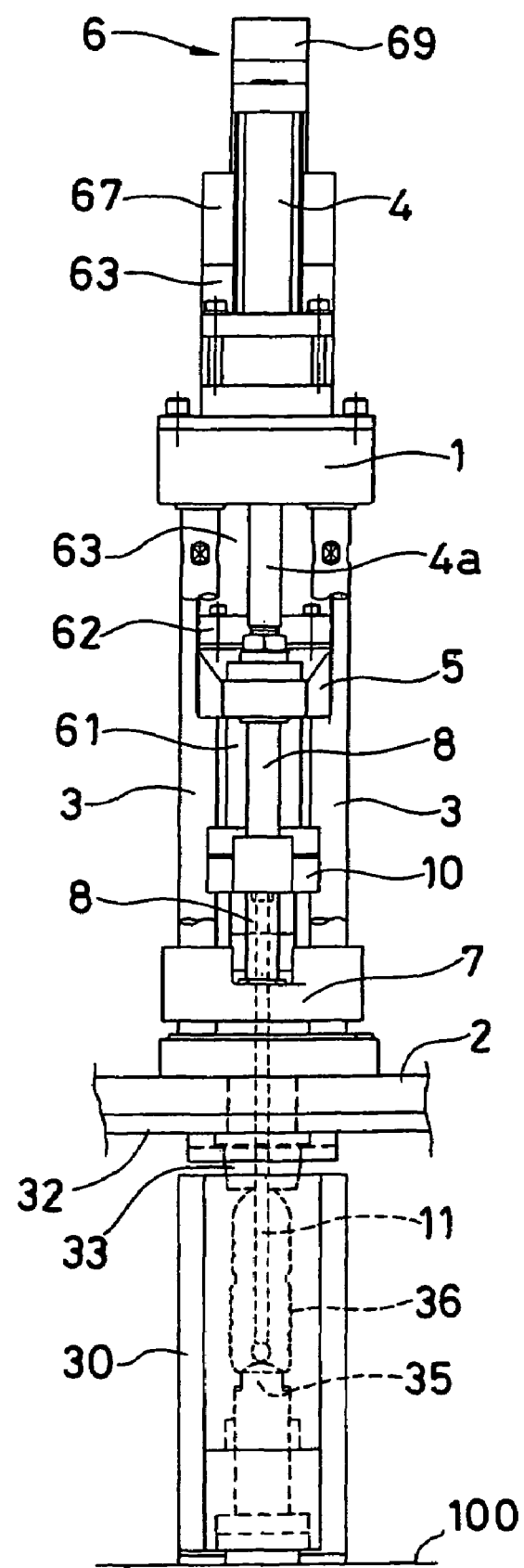
FIG. 4 is a side view of the stretch blow molding machine when stretch blow molding is operated.

Then, a bottom mold 35 is lifted up to the cavity, and a bottle 36, having a same shape as the pattern of the cavity 31, is stretch blow molded (see FIG. 3).

After blow molding is finished, opening of the blow mold 30 and lifting of whole device with platen 2 are done, and during the process, drawing of the piston rod 4a of the lifting cylinder 4 and reverse rotation of the magnetic screw shaft 66 by the electrical servo motor 69 are operated. As the piston rod 4a is drawn, both mounting base 5 and core supporting plate 7 are lifted up to their original position.

Besides, by the reverse rotation (right) of the magnetic screw shaft 66, the magnetic nut member 65 moves the plunger 61 upward. As the plunger 61 reaches the original position, the electrical servo motor 69 applies torque to prevent the magnetic screw shaft from rotating forward by the weight of the rod fixing plate 10, so that the rod fixing plate 10 can be retained at the upper position as illustrated in FIG. 1.

Moreover, in the embodiment illustrated on the drawing, the electrical servo motor 69 is mounted on the upper end of the cylinder 63 and connected directly to the magnetic screw shaft 66. Also, the electrical servo motor 69 can be mounted parallel to the cylinder 63 by using a transferring means such as a toothed pulley and a timing belt which enables to transmit the rotary movement to the magnetic screw shaft.

Figure 5:
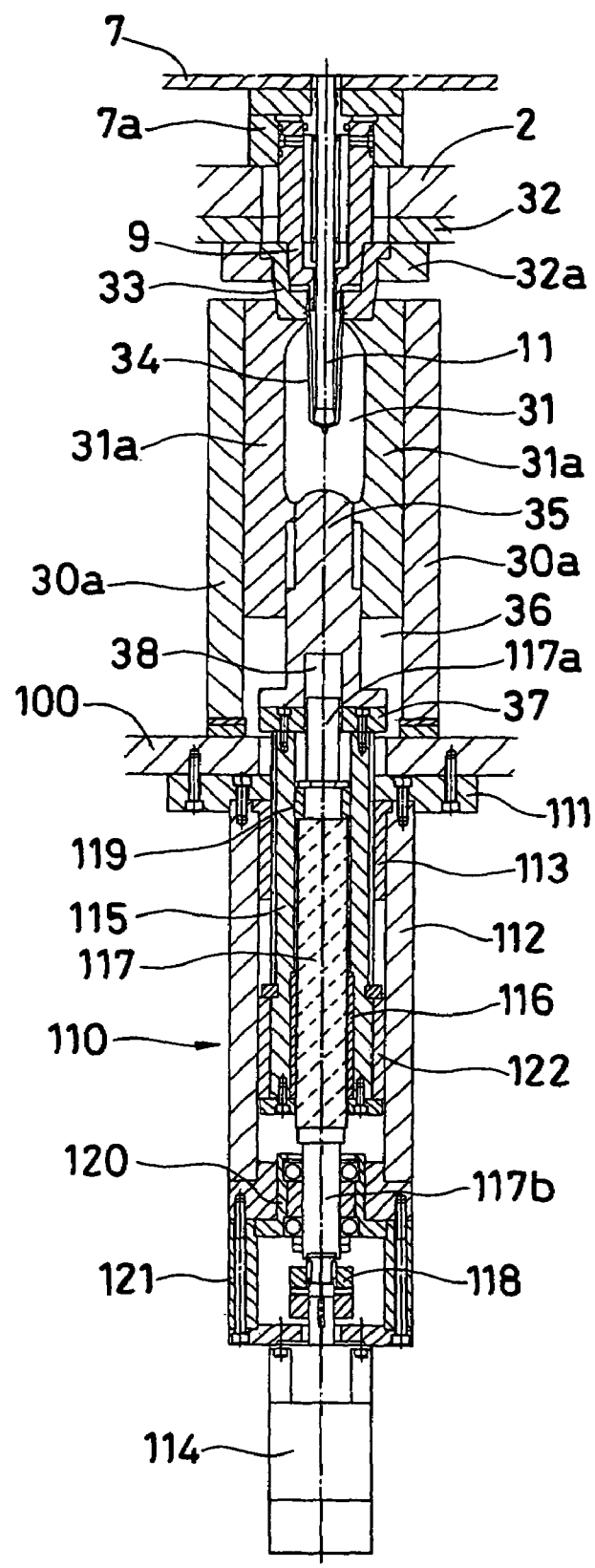
FIG. 5 is a vertical sectional front view illustrating the blow mold device having a bottom mold lifting device according to the present invention.

FIG. 5 illustrates an embodiment which applies the magnetic nut member and the magnetic screw shaft for a lifting device 110 of the bottom mold 35 of the blow mold 30.

The blow mold 30 is mounted on the inner front surface of a pair of mold fixing plates, which is facing toward each other and movable on the top surface of the base 100, and the blow mold 30 comprises a pair of a split molds 31a, movably facing toward each other, and the bottom mold 35, which closes the lower portion of the split mold 31a and forms the bottom surface of the cavity 31, of which the upper end is opened and formed in the split mold 31a. A lifting space 36 for the bottom mold 35 is prepared between the base 100 and lower surface of the split mold 31a in order to place the bottom mold 35 into the cavity 31.

The lifting device 110, which moves the bottom mold 35 in and out from the cavity 31, is mounted vertically on the lower surface of the base plate under the blow mold 30. The lifting device 110 comprises a long cylinder 112, of which the upper end is connected on the fixing plate 111 under the base 100 and which is also used as a casing; a spline bush 113, which is fit in the front end of the cylinder 112; an electrical servo motor 114, which is fixed at lower end of the cylinder 112; a cylindrical plunger 115, having a splined portion, formed on the outer peripheral surface except the lower portion, inserted into the cylinder 112 through the spline bush 113, and of which front end is connected to the lower surface of the bottom mold 35 via a fixing plate 37; a magnetic nut member 116, which is fit in the lower inside of the plunger 115; a magnetic screw shaft 117, rotatably inserted into the plunger 115 through the magnetic nut member 116, and of which rear end is connected to the drive shaft of the electrical servo motor 114 with a joint 118.

A front shaft 117a of the magnetic screw shaft 117 is movable in a concavity 38 of the bottom mold 35, and a second bearing 119 is installed between the front shaft 117a and the plunger 115. Besides, a rear shaft 117b is rotatably guided in a first bearing member 120, which is fit in the rear end of the cylinder 112. The second bearing 119 and the first bearing member 120 support the magnetic screw member 117 vertically in the plunger 115. A base 121 for the electrical servo motor 114 is mounted under the first bearing member 120, and the drive shaft of the electrical servo motor 114 and magnetic screw shaft 117 are jointed inside the base 121.

A bush 122 is installed between the cylinder 112 and outer peripheral surface of the rear end of the plunger 115 to retain the axis.

The magnetic nut member 116 and magnetic screw shaft 117 having about 65 N of step out strength comprise spiral N magnetic pole and S magnetic pole alternately provided on inner peripheral surface of a cylindrical permanent magnetic member and outer peripheral surface of a permanent magnetic shaft at a same regular pitch similarly to the magnetic screw shaft 66 of the extending device 6 mentioned above. The magnetic screw shaft 117 is set into the magnetic nut member 116 with keeping required clearance (e.g. 0.5 mm) so as to match the magnetic pole to oppose the magnetic nut member 116 at the same poles each other, and inserted into the plunger 115. The required clearance is maintained by the second bearing 119, supporting the front shaft 117a, and the first bearing member 120, supporting the rear shaft 117b, and the magnetic screw shaft 117 keeps the magnetic pole opposed to the magnetic nut member 116 at the same poles each other.

By using the lifting device 110, mentioned above, the bottom center of the preform can be securely clamped to prevent the bottom center of the bottle being blow molded from getting off centered. Each drawing of FIG. 6 illustrates the process of the blow molding a bottle 40 with using bottom clamping method by order.

When the preform 34, retained by the neck mold 33, is placed at the center of the cavity 31 formed by closing the blow mold 30, the blow core member 9 fits airtightly into the neck mold 33 from above, and the stretch rod 11 at the center is inserted into the preform 34 until the tip member reaches the internal bottom. Before or after that, or at the same time, when the electrical servo motor 114 of the lifting device 110 is operated forward, rotation of the magnetic screw shaft 117 moves the magnetic nut member 116 and the plunger 115 upward together, as illustrated in FIG. 6 (A), and the bottom mold 35, mounted on the upper end of the plunger 115, moves up to where the bottom of the preform is and sticks into the cavity 31.

Then, the electrical servo motor 114 is switched to breaking operation to prevent the magnetic screw shaft 117 from rotating reverse by the weight of the bottom mold 35 and retain the bottom mold 35 at the sticking position. The breaking force given upon the magnetic screw shaft 117 is controlled lower than the downward force, which the plunger 115 receives through the bottom mold 35 when the stretch rod 11 presses the bottom mold 35 hard, and the magnetic nut member 116, which moves down with the plunger 115 by the downward force, rotates the magnetic screw shaft 117 reverse and enables to absorb the downward force. After the bottom mold 35 is lifted or by synchronizing with the upward movement of the bottom mold 35, the stretch rod 11 is extended at low speed (lower than 80 mm/sec), and at the same time, blow air is blown into the preform 34 from the blow core member 9 at low pressure (lower than 0.2 MPa).

Figure 6:
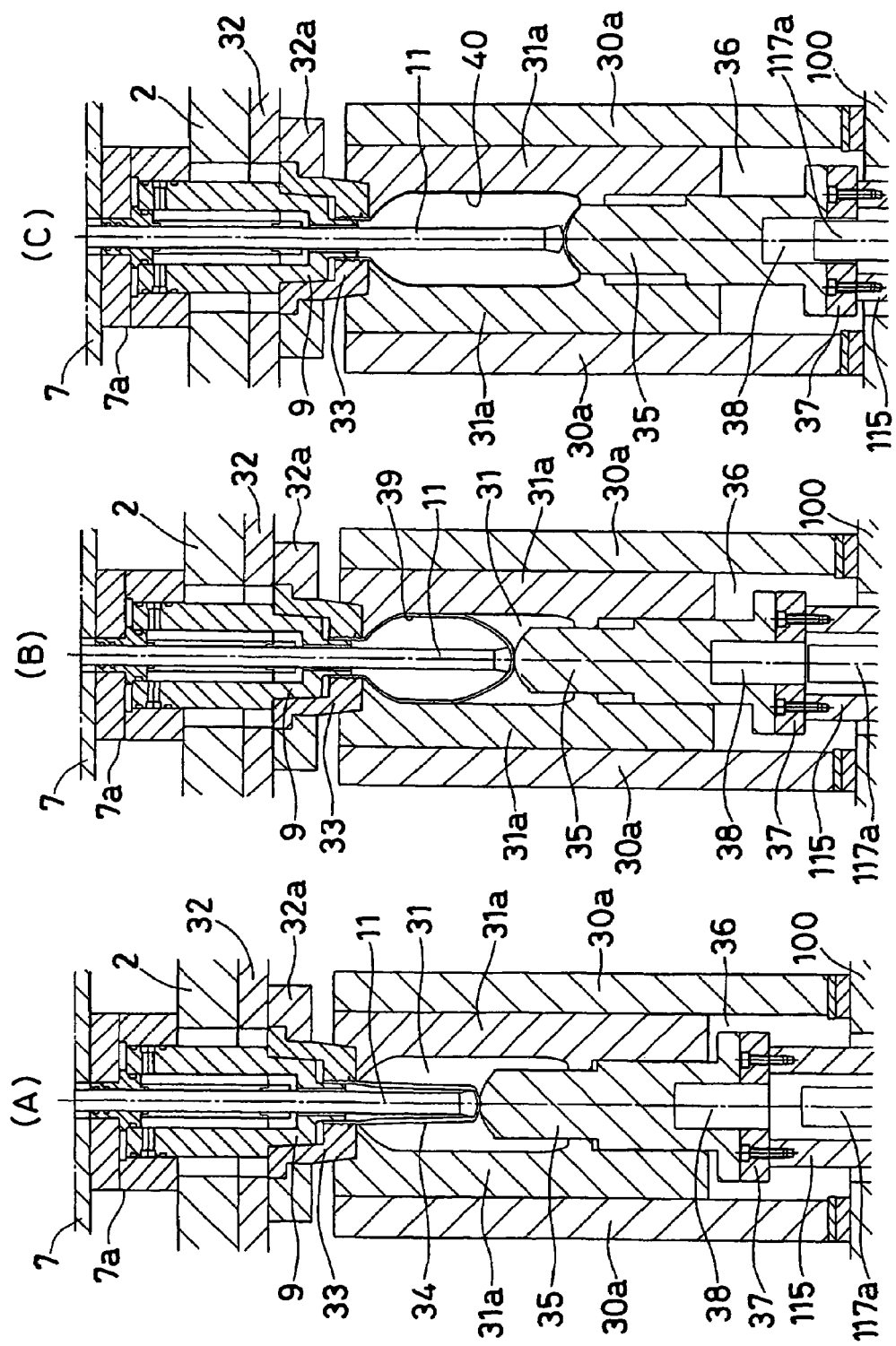
FIG. 6 is an explanatory drawing illustrating the stretch blow molding process which prevents the off-centered bottom by lifting the bottom up.

Therefore, as illustrated in FIG. 6 (B), the preform 34, lower than the neck portion, is expanded and stretched downwardly while the bottom of the preform 34 is clamped by the tip member of the stretch rod 11 and the bottom mold 35, and as illustrated in FIG. 6 (C), the preform expands fully to the cavity.

Clamping the bottom of the preform 34 prevents the bottom of the stretch blow molded bottle from missing the center, and stretch and expansion are done slowly, so synchronizing stretch speed and expansion speed becomes easier than the normal stretch method which only uses the stretch rod 11. As a result, it enables to operate stretch blow molding a bottle larger than 1 litter, of which wall thickness tends to be uneven caused by missing the center because of the great stretch ratio, regardless of a kind of resin easily. Besides, the cavity surface of the bottom mold 35 holds the bottom portion of the preform, so a mark of clamping is hardly left on the bottom of the bottle, and bottle 40 having a uniform bottom thickness can be molded.

As mentioned above, the present invention, which drives a stretch rod or a bottom mold by converting rotary movement of the magnetic screw shaft made by the electrical servo motor to linear movement with the magnetic nut member, does not require a indispensable circulating path for balls on the sides of a ball nut, and since the magnetic nut member does not have a portion sticking out from the side, the magnetic nut member and the magnetic screw shaft with the plunger can be installed inside the cylinder, and it can be used as a single and compact converter having simple structure. Also, the weight of the device is small, and installation of the device only takes installation of the cylinder, so that installation does not take a long time and can be done safely even if the mounting location is above the stretch blow device or in the narrow area under the blow mold device inside the base.

Moreover, the magnetic nut member does not engage with the magnetic screw shaft, but maintains the required clearance and flows freely around the screw shaft without contact, so the response is quick, and the backlash is close to none. Therefore, positioning the stretch rod or the bottom mold can be precise, fatigue fracture caused by the compressive stress does not occur like it does on a ball screw, the magnetic nut member maintains the function for a use of a long period of time, and maintenance becomes easier.

Further, with using the magnetic screw shaft and the magnetic nut member, if the magnetic nut member receives larger thrust impact than the torque applied to the magnetic screw shaft, the magnetic screw shaft rotates reverse according to the impact, the magnetic nut member moves with the plunger according to the reverse rotation and absorbs the impact, so even if the stretch rod hits the bottom mold hard over and over, the stretch rod won't be bent by the impact. Furthermore, in the case that the bottom mold is lifted into the cavity to clamp the bottom portion of the preform with the stretch rod, a complicated servo control to synchronize both members is not necessary. Therefore, the control means becomes simpler than a conventional technique.

INDUSTRIAL APPLICABILITY

According to the present invention, by installing a magnetic nut member and a magnetic screw shaft with a plunger inside a cylinder, and connecting a servo motor to the magnetic screw shaft, a single and compact converter can be provided. The converter can be installed to a device by connecting the plunger to a movable member and connecting the cylinder to a fixed member, so it is easy to adapt to an extending device for a stretch rod or lifting device for a bottom mold, and it has higher probability to be adapted than a conventional converter comprising a ball nut member and a ball screw shaft.

The invention claimed is:

1. A stretch rod extending device for a stretch blow molding machine, wherein said stretch blow molding machine comprises:

a blow mold being openable and closable;

a neck mold holding a preform and closing with said blow mold;

a core supporting plate holding a blow core member which fits with said neck mold; and a rod fixing plate holding a stretch rod inserted into said preform through said blow core member;

wherein said neck mold, said core supporting plate, and said rod fixing plate are movable up and down together or separately, and said rod fixing plate is connected to a stretch rod extending device, and said stretch rod extending device comprises a nut member and a screw shaft which converts the rotation of a electrical servo motor to linear movement, and wherein the nut member and the screw shaft comprise a magnetic nut member and a magnetic screw shaft having spiral N magnetic pole and S magnetic pole alternately provided on inner peripheral surface of a cylindrical permanent magnetic member and outer peripheral surface of a permanent magnetic shaft at the same pitch, and said magnetic screw shaft is inserted into a cylindrical plunger having said magnetic nut member equipped inside by keeping required clearance between said magnetic screw shaft and said magnetic nut member so as to match the same magnetic poles.

2. The stretch rod extending device for a stretch blow molding device according to claim 1, wherein said stretch rod extending device comprises;

a cylinder having the front end being opened and the rear end being closed;

said cylindrical plunger being inserted into said cylinder and movable in and out from the front end of said cylinder;

said magnetic nut member being fitted inside said plunger;

said magnetic screw shaft being stably inserted from a first bearing member fixed on the rear end of said cylinder, into said plunger through said magnetic nut member by keeping required clearance between said magnetic screw shaft and said magnetic nut member so as to match the same magnetic poles; and said electrical servo motor being connected to said magnetic screw shaft and rotates said magnetic screw shaft forward or reverse.

3. The stretch rod extending device for a stretch blow molding device according to claim 1, wherein the required clearance between said magnetic nut member and said magnetic screw shaft is maintained by a front shaft of said magnetic screw shaft, a second bearing, installed between said front shaft and said plunger, and said first bearing member.

4. The stretch rod extending device for a stretch blow molding device according to claim 1, wherein said extending device is installed on said stretch blow molding device by mounting said cylinder vertically with keeping said electrical servo motor up on a mounting base, which is connected to said core supporting plate and set above said rod fixing plate, and said plunger is connected to said rod fixing plate.

5. The stretch rod extending device for a stretch blow molding device according to claim 1, wherein said rod fixing plate is movable up and down between said mounting base which is connected to a piston rod of a lifting cylinder mounted on the upper portion of said stretch blow molding device and is installed above said rod fixing plate, and said core supporting plate below with being guided by a tie rod connecting said mounting base and said core supporting plate, and said rod fixing plate moves up and down with said core supporting plate by said lifting cylinder via said extending device connected to both said mounting base and said core supporting plate.

6. A bottom mold lifting device for a stretch blow molding machine, wherein said stretch molding machine comprises;

a blow mold being openable and closable;

a neck mold holding a preform and closing with said blow mold;

a stretch rod being inserted into said preform through said blow core member, which fits into said neck mold; and wherein a lifting device for a bottom mold of said blow mold comprises a nut member and a screw shaft which converts the rotation of a electrical servo motor to linear movement, and wherein the nut member and the screw shaft comprise a magnetic nut member and a magnetic screw shaft having spiral N magnetic pole and S magnetic pole alternately provided on inner peripheral surface of a cylindrical permanent magnetic member and outer peripheral surface of a permanent magnetic shaft at the same pitch, and said magnetic screw shaft is inserted into a cylindrical plunger having said magnetic nut member equipped inside by keeping required clearance between said magnetic screw shaft and said magnetic nut member so as to match the same magnetic poles.

7. The bottom mold lifting device for the stretch blow molding machine according to claim 6, wherein said bottom mold lifting device comprises;

a cylinder, of which the front end is opened and the rear end is closed;

a spline bush, which fits in the front end of the cylinder;

the plunger having a splined portion formed on the outer peripheral surface and engaging with said spline bush, and being movable in and out from the front end of said cylinder;

the magnetic screw shaft being stably inserted from a first bearing member fixed on the rear end of said cylinder, into said plunger through said magnetic nut member by keeping required clearance between said magnetic screw shaft and said magnetic nut member so as to match the same magnetic poles; and said electrical servo motor is connected to a rear shaft and rotates said magnetic screw shaft forward or reverse, and wherein said cylinder is mounted vertically on the lower surface of said base under said blow mold with keeping said electrical servo motor down, and the plunger is connected to said bottom mold through the opening of said base.

8. The bottom mold lifting device for the stretch blow molding machine according to claim 6, wherein a front shaft of said magnetic screw shaft is movable in a concavity of said bottom mold, and the required clearance between said magnetic nut member and said magnetic screw shaft is maintained by said first bearing member and a second bearing installed between said front shaft and said plunger.

9. The stretch rod extending device for a stretch blow molding device according to claim 2, wherein the required clearance between said magnetic nut member and said magnetic screw shaft is maintained by a front shaft of said magnetic screw shaft, a second bearing, installed between said front shaft and said plunger, and said first bearing member.

10. The stretch rod extending device for a stretch blow molding device according to claim 2, wherein said extending device is installed on said stretch blow molding device by mounting said cylinder vertically with keeping said electrical servo motor up on a mounting base, which is connected to said core supporting plate and set above said rod fixing plate, and said plunger is connected to said rod fixing plate.

11. The stretch rod extending device for a stretch blow molding device according to claim 2, wherein said rod fixing plate is movable up and down between said mounting base which is connected to a piston rod of a lifting cylinder mounted on the upper portion of said stretch blow molding device and is installed above said rod fixing plate, and said core supporting plate below with being guided by a tie rod connecting said mounting base and said core supporting plate, and said rod fixing plate moves up and down with said core supporting plate by said lifting cylinder via said extending device connected to both said mounting base and said core supporting plate.

12. The stretch rod extending device for a stretch blow molding device according to claim 3, wherein said rod fixing plate is movable up and down between said mounting base which is connected to a piston rod of a lifting cylinder mounted on the upper portion of said stretch blow molding device and is installed above said rod fixing plate, and said core supporting plate below with being guided by a tie rod connecting said mounting base and said core supporting plate, and said rod fixing plate moves up and down with said core supporting plate by said lifting cylinder via said extending device connected to both said mounting base and said core supporting plate.

13. The stretch rod extending device for a stretch blow molding device according to claim 4, wherein said rod fixing plate is movable up and down between said mounting base which is connected to a piston rod of a lifting cylinder mounted on the upper portion of said stretch blow molding device and is installed above said rod fixing plate, and said core supporting plate below with being guided by a tie rod connecting said mounting base and said core supporting plate, and said rod fixing plate moves up and down with said core supporting plate by said lifting cylinder via said extending device connected to both said mounting base and said core supporting plate.

14. The stretch rod extending device for a stretch blow molding device according to claim 9, wherein said rod fixing plate is movable up and down between said mounting base which is connected to a piston rod of a lifting cylinder mounted on the upper portion of said stretch blow molding device and is installed above said rod fixing plate, and said core supporting plate below with being guided by a tie rod connecting said mounting base and said core supporting plate, and said rod fixing plate moves up and down with said core supporting plate by said lifting cylinder via said extending device connected to both said mounting base and said core supporting plate.

15. The stretch rod extending device for a stretch blow molding device according to claim 10, wherein said rod fixing plate is movable up and down between said mounting base which is connected to a piston rod of a lifting cylinder mounted on the upper portion of said stretch blow molding device and is installed above said rod fixing plate, and said core supporting plate below with being guided by a tie rod connecting said mounting base and said core supporting plate, and said rod fixing plate moves up and down with said core supporting plate by said lifting cylinder via said extending device connected to both said mounting base and said core supporting plate.

16. The bottom mold lifting device for the stretch blow molding machine according to claim 7, wherein a front shaft of said magnetic screw shaft is movable in a concavity of said bottom mold, and the required clearance between said magnetic nut member and said magnetic screw shaft is maintained by said first bearing member and a second bearing installed between said front shaft and said plunger.

* * * * *